F. R. McGEE.
FLEXIBLE COUPLING.
APPLICATION FILED JUNE 22, 1918.

1,316,733.

Patented Sept. 23, 1919.
5 SHEETS—SHEET 1.

INVENTOR
FRANK R. McGEE.
by D. Anthony Usina
HIS ATTORNEY.

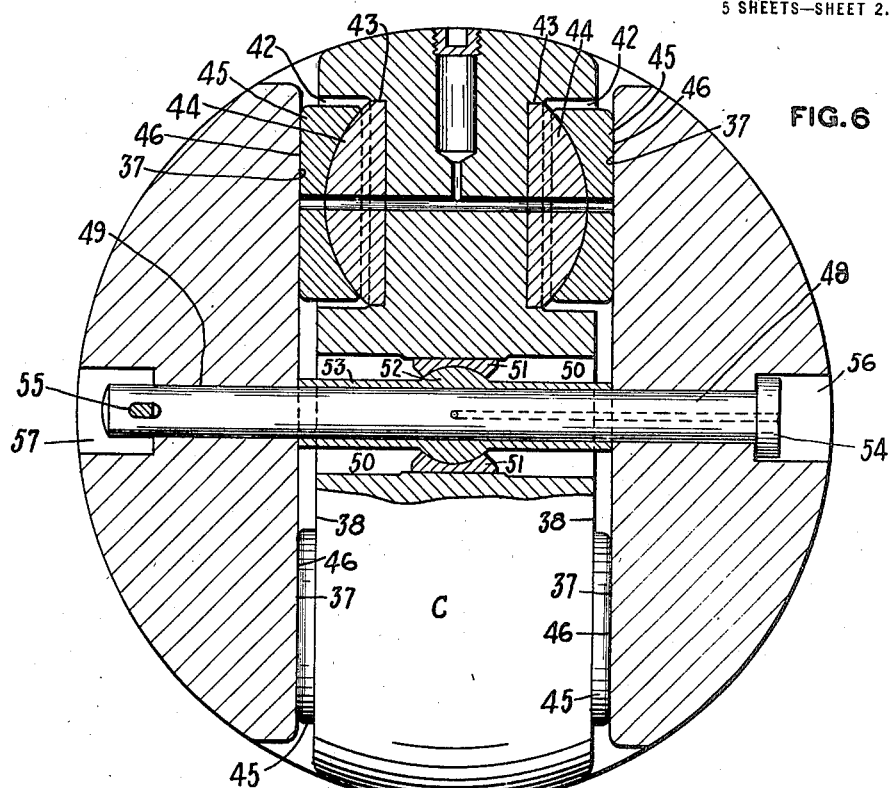
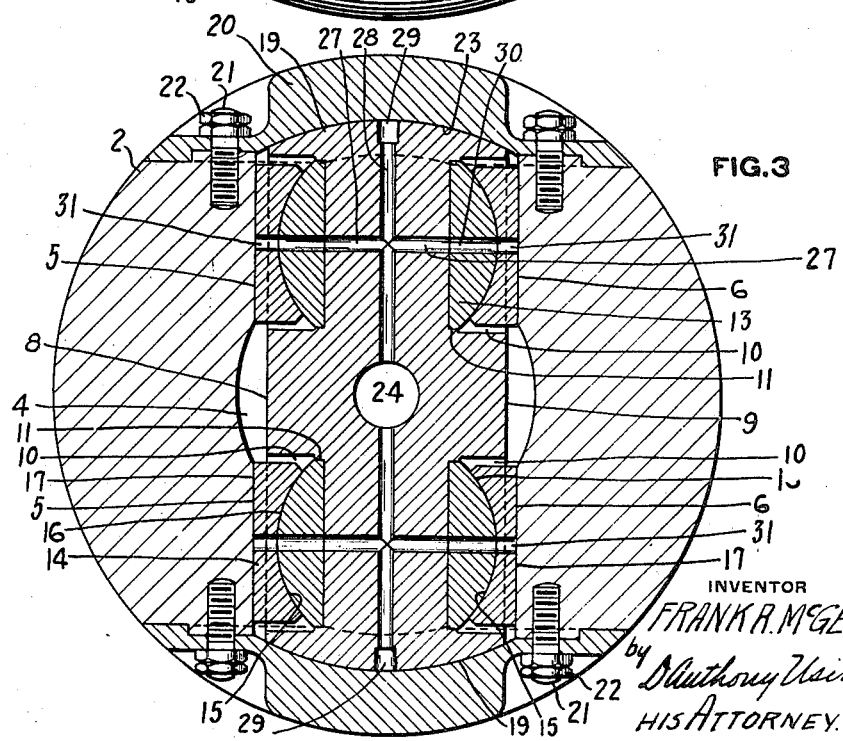

F. R. McGEE.
FLEXIBLE COUPLING.
APPLICATION FILED JUNE 22, 1918.
1,316,733.
Patented Sept. 23, 1919.
5 SHEETS—SHEET 3.
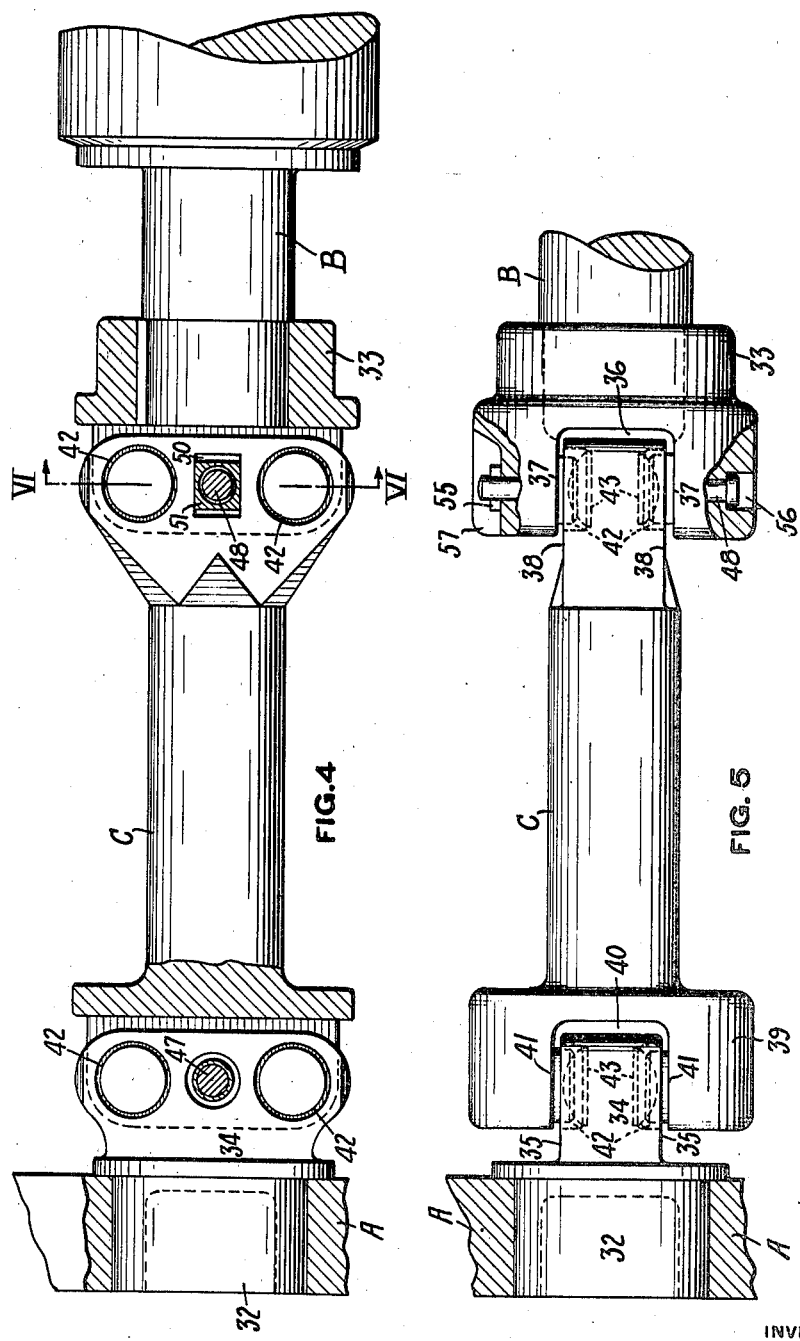
INVENTOR
FRANK R. McGEE.
by D. Anthony Usina
HIS ATTORNEY.

F. R. McGEE.
FLEXIBLE COUPLING.
APPLICATION FILED JUNE 22, 1918.
1,316,733.
Patented Sept. 23, 1919.
5 SHEETS—SHEET 4.
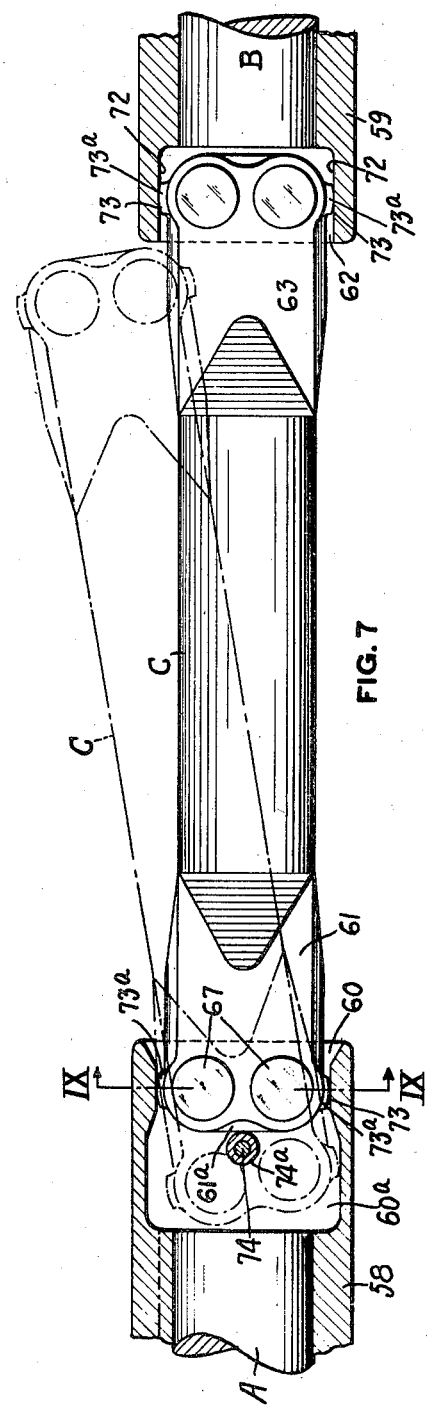
FIG. 7
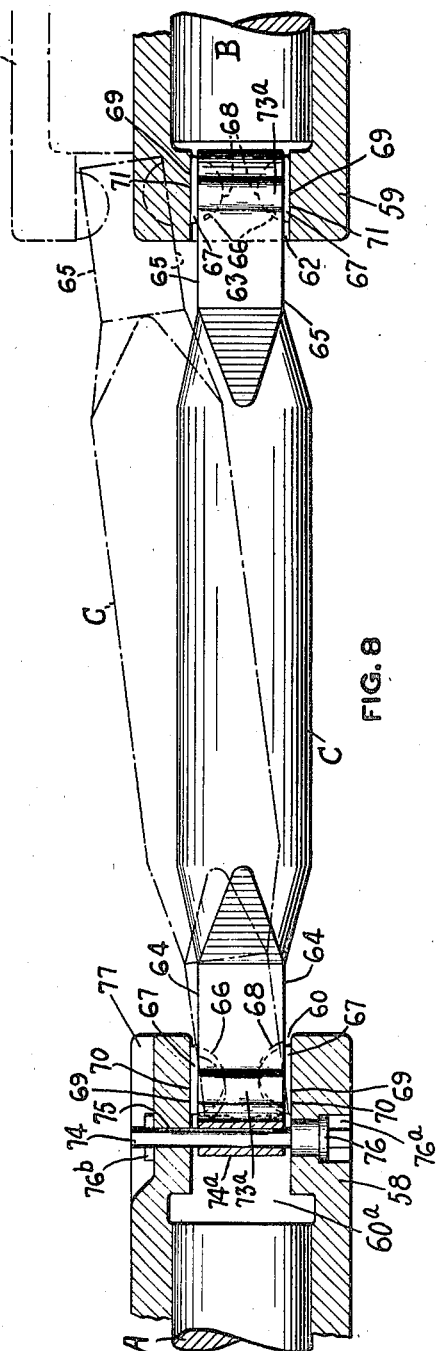
FIG. 8
INVENTOR
FRANK R. McGEE
by
HIS ATTORNEY.

F. R. McGEE.
FLEXIBLE COUPLING.
APPLICATION FILED JUNE 22, 1918.

1,316,733.

Patented Sept. 23, 1919.
5 SHEETS—SHEET 5.

INVENTOR
FRANK R. McGEE.
by D. Anthony Usina
HIS ATTORNEY.

UNITED STATES PATENT OFFICE.

FRANK R. McGEE, OF STEUBENVILLE, OHIO.

FLEXIBLE COUPLING.

1,316,733. Specification of Letters Patent. Patented Sept. 23, 1919.

Application filed June 22, 1918. Serial No. 241,321.

*To all whom it may concern:*

Be it known that I, FRANK R. McGEE, a citizen of the United States, and resident of Steubenville, in the county of Jefferson and State of Ohio, have invented certain new and useful Improvements in Flexible Couplings, of which the following is a specification.

My invention relates to flexible couplings used to connect the contiguous ends of rotary shafts or spindles, and while not limited to such use, more particularly relates to flexible couplings used to form a universally movable joint between the spindles and the rolls and roll driving pinions of rolling mills having a vertically movable top roll, such as for example, two high reversing blooming mills, or plate mills.

One object of the invention is to provide a flexible coupling of simple and compact construction having novel means whereby rotatable shafts are coupled so as to be universally movable and in such manner as to rotate in unison without undue binding or excessive wear, while the shaft members are in various axially angular positions.

Another object of my invention is the provision of a flexible coupling having novel means whereby necessary universal movement is made possible between the relatively movable parts of the couplings.

Still further objects of the invention consist in the novel constructions, arrangements and combination of parts, shown in the drawings, to be described in detail hereinafter, and to be particularly pointed out in the appended claims.

Referring now to the drawings, forming part of this specification, Figure 1 is a sectional plan showing a rolling mill spindle or shaft having flexible universally movable couplings on the end thereof, embodying the novel features of my invention.

Fig. 3 is a sectional end elevation on the line III—III of Fig. 1, showing details in the construction of the flexible coupling of Figs. 1 and 2.

Fig. 4 is a sectional plan, similar to that of Figure 1, showing a modified form of flexible coupling constructed in accordance with my invention.

Fig. 5 is a side elevation, partly broken away, of the apparatus illustrated in Fig. 4.

Fig. 6 is a sectional end elevation of the apparatus shown in Figs. 4 and 5, the section being taken on the line VI—VI of Fig. 4.

Fig. 7 is a sectional plan, showing a further modified form of flexible coupling, constructed in accordance with my invention.

Fig. 8 is a side elevation, partly in section, of the apparatus shown in Fig. 7.

In the accompanying drawings, the letters A and B designate a driving and a driven shaft, or equivalents thereof, rotatably mounted in suitable bearings, and connected to the adjacent ends of the shafts A and B is a spindle C, flexible couplings embodying the novel features of my invention being used to rotatably connect the shafts A and B with the contiguous ends of the spindle C.

Figure 1:
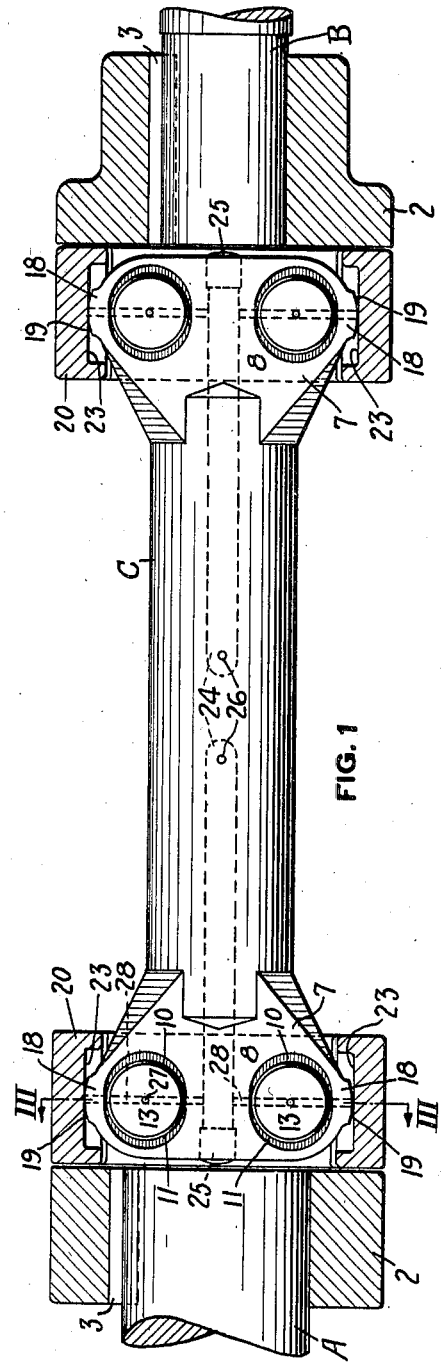
Figure 2:
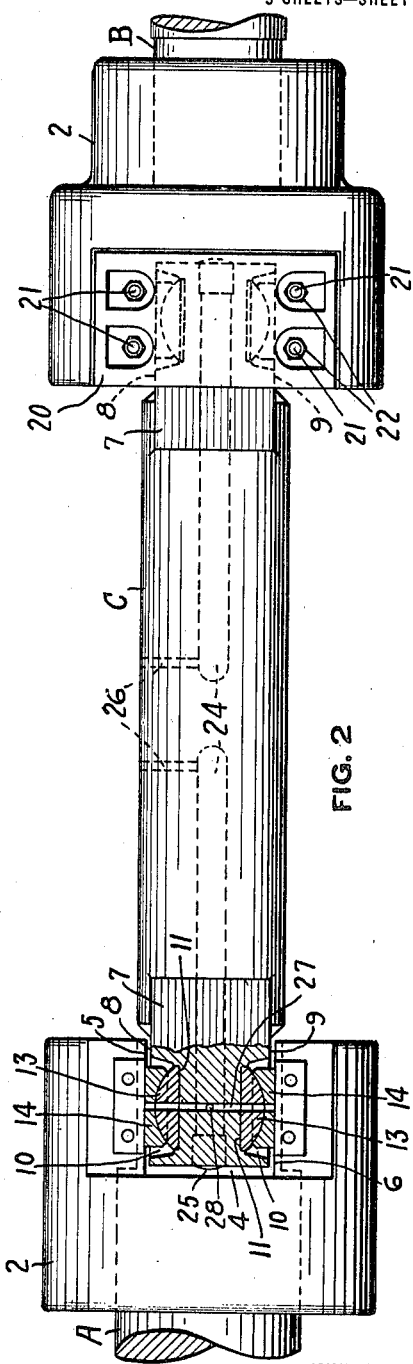
Fig. 2 is a side elevation, partly in section, of the apparatus shown in Fig. 1.

In Figs. 1 and 2, a hub 2 is secured on one end of the driving shaft A, being fastened to the shaft so as to rotate therewith by means of a key 3 seated in registering keyways in the shaft A and hub 2. One end of the hub 2 extends beyond the end of the shaft A, and the projecting hub end has a transverse recess or slot 4 therein, at least part of the opposite side surfaces 5 and 6 of this transverse slot being in parallel planes.

The driven shaft B, also has a hub 2 which is fastened to the shaft by a key 3, one end of the hub extending beyond the end of the shaft B, and the projecting hub end having a transverse recess or slot 4 therein, with at least part of the side surfaces 5 and 6 of the slot in parallel planes.

The spindle C has flattened ends 7—7 which project into the slots 4 in the ends of the hubs 2, and the opposite side surfaces 8 and 9 of the flattened spindle ends 7 are in parallel planes, the thickness of the ends 7 being somewhat less than the width or distance between the side surfaces 5, 6, of the slots 4.

Each of the surfaces 8 and 9 on the flattened ends 7 of the spindle C has a plurality of circular recesses 10 therein, and the bottom of each recess 10 has a shallow, cylindrical counterbore 11 in the bottom thereof, forming a seat for the hardened hemispherical washers 13 secured in the recesses. The washers 13, as shown, have edges engaging the cylindrical side walls of the counterbore 11, and fitting tightly therein to prevent any movement of the washer 13 relative to the spindle C.

In the apparatus shown in Figs. 1, 2, and 3, a washer 14 having a concave hemispherical surface 15, which fits the convex surface 16 of the hemispherical washers 13, is mounted on each of the washers 13, the flat face 17 of the washers 14 slidingly engaging with the flat surfaces 5 and 6 forming the opposite sides of the transverse slots 4 in the end of the hubs 2.

By reference to Fig. 3 it will be seen that when the pairs of washers 13, 14 are located on the opposite sides of the flattened ends 7 of the spindle C, that the overall distance between the flat faces 17, 17 of the concave washers 14, on opposite sides of the flattened spindle ends 7 is the same as the width or distance between the flat faces 5 and 6 of the transverse slots 4 in the ends of the hubs 2.

The flattened ends 7 of the spindle C also have projections 18 on opposite ends thereof, the outer surface 19 of these projections being hemispherical, so as to permit of universal movement of the spindle end within the slot 4.

Each end of the transverse slots 4 has a removable hub cap 20 which closes the opposite ends of the slots, the hub caps being detachably secured to the hubs by means of stud bolts 21 and nuts 22. (See Figs. 2 and 3). The curved inner surface 23 of the hub caps is machined to fit the hemispherical surfaces 19 of the projections 18 on the flattened ends of the spindle C so as to prevent relative sidewise movement of the ends of the spindle in the slots 4 of the hub 2.

A hub cap 20 will be removed from one or both of the hubs 2 in removing and assembling the parts in operative position, as will be readily understood.

To provide for lubrication of the slidable surfaces of my improved flexible coupling, the spindle C preferably is provided at each end with a reservoir formed by the hole 24 which extends axially inward for some distance. The outer ends of the holes 24 are closed tightly by means of plugs 25, and the inner ends thereof are connected with the exterior of the spindle C by small, transversely extending holes 26, the holes 26 providing means for supplying lubricant to the reservoirs 24.

The spindle C also has small transverse oil holes 27 in the flattened ends thereof which extend from one face to the other of the counterbores 11 in opposite faces 8 of the flattened portions 7 of the spindle, and these oil holes are intersected by transverse holes 28 bored at right angles thereto which serve to connect the holes with the reservoirs 24 in the body of the spindle. Plugs 29 are tightly driven in the outer ends of the holes 28 to prevent leakage of lubricant. The transverse holes 27 in the ends of the spindle register with similar holes 30, 31 on the axis of the hemispherical washers so as to supply lubricant to the slidable faces of these washers and to the faces 5 and 6 of the slots 4 in the hubs 2.

In the modification shown in Figs. 4, 5, and 6, the overhung crank A of an engine and the neck B of a rolling mill pinion are rotatably connected to a spindle C by universally movable couplings embodying my invention, the crank A and neck B forming equivalents of the driving shaft A and driven shaft B of Figs. 1, 2, and 3. A pod 32 is shrunk on and keyed to the crank A and a coupling 33 is similarly fastened to the end of the pinion neck B to provide connections for the ends of the interposed spindle C. The projecting end 34 of the pod 32 is flattened, and at least part of the flattened sides 35, 35 of the pod end 34 are in parallel planes. The projecting end of the coupling 33 has a transverse slot 36 therein, the opposite side surfaces 37, 37, of the slot 36 being in parallel planes. (See Figs. 5 and 6). The spindle C of Figs. 4, 5, and 6 is flattened on but one, instead of on both ends, as in Figs. 1, 2, 3, the flat side surfaces 38, 38 being in parallel planes. An integral enlargement 39 is provided on the other end of the spindle C, the outer end of this enlargement having a transverse slot 40 therein with opposite parallel side walls 41, 41. A plurality of depressions 42 having shallow counterbored recesses 43 in the bottom thereof are formed on each of the flat faces 35, 35 of the pod 32, and on the flat faces 38, 38 on the flattened end of the spindle C, in the same manner as on the spindle of Figs. 1, 2, and 3.

Seated in each of the depressions 42 is a hardened steel hemispherical washer 44, the cylindrical edges and flat faces of these washers tightly fitting in the cylindrical recesses 43 in the bottom of the depressions 42, and a cylindrical washer 45 having a concave hemispherical face, of the same contour as the convex face of the washers 44, is positioned on each of these washers. The distance between the flat faces 46 of the opposite washers 45 on opposite sides of the flattened end 34 of the pod 32 and on the flattened end of the spindle C is the same as the distance between the opposite flat sides 37, 37, and 41, 41, of the slots 36 and 40 in the end 39 of the spindle and in the hub 33 so as to form a sliding fit therebetween.

The ends of the slots 36 and 40 are not closed by hub caps as in Figs. 1, 2, and 3, the slotted end of the spindle C being anchored to the projecting end 34 of the pod 32 by a carrier pin 47 which extends through registering holes in the end 39 of the spindle C and the pod 34. The pin 47 has a head on one end and a key, which extends transversely through a slot in the other end of the pin, detachably fastens the pin in anchoring position on the enlarged end 39 of the spindle.

A pin 48 also extends through holes 49, 49 in the hub 33 and a registering hole 50 in the flattened end of the spindle C. This being the "slip" end of the spindle, the transverse hole 50 in the spindle is made rectangular in cross section and seated within the rectangular hole are bearing blocks 51, 51 having opposite concave hemispherical faces which engage with the convex hemispherical enlargement 52 in the middle of the length of the sleeve 53 through which the pin 48 extends. The sleeve 53 is of such length that its ends neatly fit between the opposite faces 37, 37 of the slot 36 in the hub 33, the sleeve acting to hold the assembled bearing blocks 51, 51 in operative engagement with the spherical enlargement on the sleeve 53, while permitting of universal movement between the end of the spindle C and coacting slotted end of the coupling 33. (See Fig. 6). A head 54 on one and a key 55 in the other end of the pin 48 maintains the pin in place, the head and key being seated in the recess 56 and slot 57, as is shown in Fig. 6. Provision for lubricating the moving or sliding faces of the coupling of Figs. 4, 5, and 6, will be made in the same manner as is shown in Figs. 1, 2, and 3.

Figure 9:
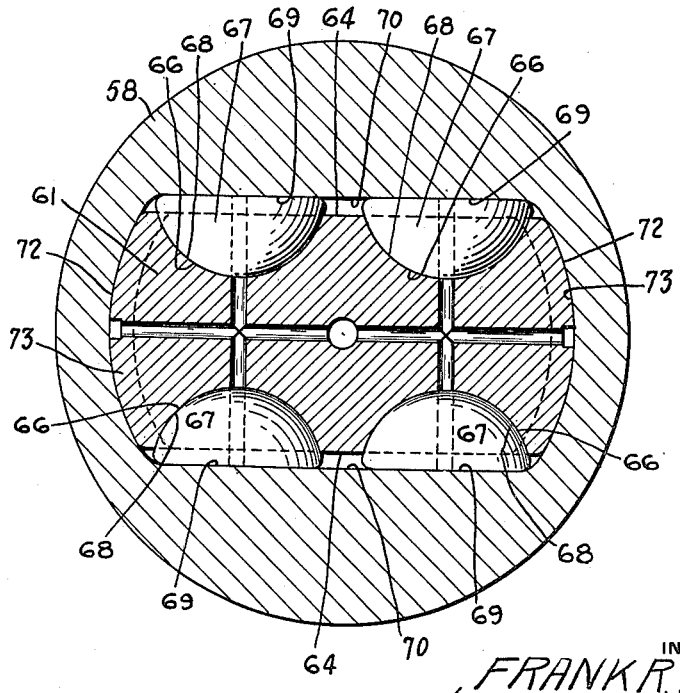
Fig. 9 is a sectional end elevation on the line IX—IX of Fig. 7, showing details in the construction of the universally movable members of the coupling of Figs. 7 and 8.

In the apparatus of Figs. 7, 8, and 9, driving and driven shafts A and B are rotatably connected to a spindle C by a modified form of coupling which is constructed in accordance with my invention. The adjacent ends of the shafts A and B have couplings 58 and 59 thereon, the couplings being shrunk on and keyed to the shafts as explained above in connection with the couplings of the preceding figures.

The coupling 58 has a counterbored recess 60 to receive the flattened end 61, and the coupling 59 has a recess 62 in one end to receive the other flattened end 63 of the spindle C. The counterbore 60$^a$ of the recess 60 is made of such length and transverse dimensions as will permit of the endwise movement of the spindle necessary in putting the spindle C into operative position with its flattened ends 61, 63 extending into the recesses 60 and 62.

The flat ends 61 and 63 of the spindle extend into the recesses 60, 62 in the ends of the couplings 58 and 59, and each of the opposite flat faces 64, 64 on one end and flat faces 65, 65 on the opposite end of the spindle has a plurality of hemispherical recesses 66 therein, two recesses being shown in each flat face of the spindle ends. Each of the recesses 66 is provided with a hemispherical washer 67 having a convex surface 68 of the same contour as the concave hemispherical recesses 66 and having flat faces 69 which project above the flat faces 64, 65 of the spindle ends, as is clearly shown in Fig. 9. The flat faces 69 of the washers engage with opposite parallel surfaces 70, 70 and 71, 71 within the recesses 60, 62 in the ends of the couplings 58 and 59 so as to have a sliding contact therewith.

The surfaces 72 of the recesses 60 and 62 which connect the opposite flat surfaces 70, 71 thereof, are curved, and these semi-cylindrical surfaces are engaged by the hemispherical end surfaces 73 of the projections 73$^a$ on opposite sides of the flattened ends of the spindle to prevent relative sidewise movement between the spindle ends and the couplings.

The distance between the ends of the couplings 58, 59, is less than the overall length of the spindle C, and the coupling 58 on the end of the shaft A is counterbored at its inner end to provide clearance for the end 61 of the spindle in swinging the spindle sidewise, as is done to remove it from between the opposite couplings in the manner indicated by dotted lines in Fig. 7.

The end 61 of the spindle C projecting into the counterbored recess 60 of the coupling 58 is cut away to provide a central projection 61$^a$ which engages with the thimble 74$^a$ positioned on the pin 74 which extends through registering transverse holes 75 in the coupling, to prevent endwise movement of the spindle C when the apparatus is in operation. A head 76 on one end and a key 76$^b$ extending through a slot on the other end of the pin 74 serve to keep the pin in position, the head 76 being within the recess 76$^a$ and the key 76$^b$ being seated in a slot 77 in the outer surface of the coupling 58, as is best shown in Fig. 8.

The hemispherical recesses in the flat surfaces 70 of the ends of the spindle and the hemispherical washers are provided with oil holes arranged in the same manner as in the apparatus of Figs. 1, 2, and 3, or in any other approved manner in order to supply lubricant to the wearing surfaces of the several parts.

Figure 10:
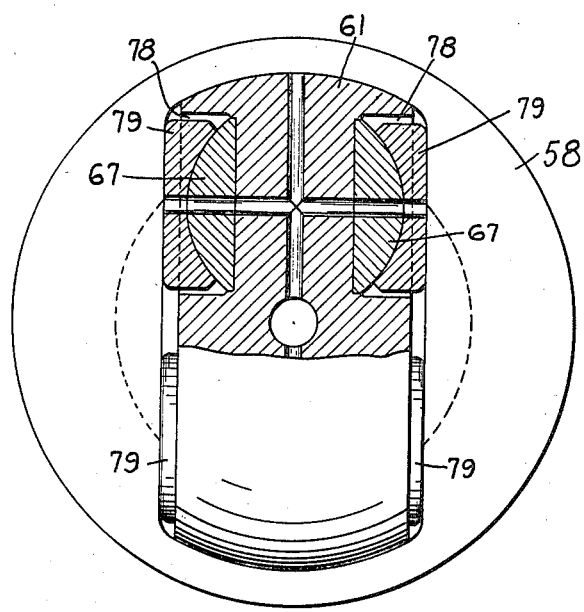
Fig. 10 is an end elevation, partly in section, showing a further modification in the construction of the universally movable members of flexible couplings adapted for use with the spindle of Figs. 8 and 9, and made in accordance with my invention.

The ends of the spindle C of Figs. 7 and 8 may be provided with circular counterbored recesses 78 in the opposite flat faces thereof, as is shown in Fig. 10, instead of the hemispherical recesses 66 of Figs. 7, 8, and 9. In such case the hardened hemispherical washers 67 will be inverted and seated in the counterbore of the recesses 78, and coacting washers 79 having concave hemispherical faces will be employed in connecting the spindle ends 61, 63 to the couplings 58, 59, the washers 67 and 79 of Fig. 9 being constructed in the same manner as in the apparatus of Figs. 1, 2, and 3, or that of Figs. 4, 5, and 6.

In the operation of my improved apparatus, which will be readily understood, the hemispherical washers provide for the universal movement necessary in couplings of the type to which my invention relates. The apparatus is simple and will not require frequent or expensive repairs. Couplings embodying my invention are particularly well adapted for the heavy duty required in driving rolling mills and similar massive machines.

Many modifications which will suggest themselves to those skilled in the art may be made, and the construction and arrangement of flexible couplings embodying my invention as defined in the appended claims.

I claim:—

1. A flexible coupling comprising a shaft having a recessed end, a second shaft having an end extending into said recess and a plurality of washers within said recess for connecting said shafts and preventing relative rotative movement thereof, said washers being arranged in planes on opposite sides of the axis of said second shaft and having hemispherical faces and being adapted to permit of limited universal movement between the coupled shafts during rotation thereof.

2. A flexible coupling comprising a shaft having a recessed end, a second shaft having an end extending into said recess and a plurality of washers within the recess for connecting the shafts and preventing relative rotation thereof, said washers being arranged in pairs in planes on opposite sides of the axis of said second shaft and having hemispherical faces adapted to permit of universal movement between the coupled shafts in rotating the shafts.

3. A flexible coupling comprising a shaft having a recessed end, a second shaft having a flattened end extending into the recess and a plurality of hemispherical washers within said recess on each flattened face of said flattened shaft end, said washers being arranged to connect the shaft ends and prevent relative rotative movement while permitting limited universal movement therebetween.

4. A flexible coupling comprising a shaft having a recessed end, a second shaft having an end extending into the recess and a plurality of hemispherical washers within said recess, said washers being arranged to connect the shaft ends and prevent relative rotative movement while permitting limited universal movement therebetween, and means for maintaining the hemispherical washers in operative position within said recess.

5. A flexible coupling comprising a shaft having a recessed end, a second shaft having an end extending into the recess and a plurality of hemispherical washers within said recess, said washers being arranged to connect the shaft ends and prevent relative rotative movement while permitting limited universal movement therebetween, and means for preventing separation of the coupled shaft ends.

6. A flexible coupling comprising a shaft having a recessed end, a second shaft having an end extending into said recess, and a plurality of hemispherical washers within said recess, said washers being operatively connected to the overlapping shaft ends to prevent relative rotative movement of the shafts, and being arranged to permit of limited universal movement between the coupled shafts.

7. A flexible coupling comprising a shaft having a recessed end, a second shaft having an end projecting into said recess and hemispherical washers between each face of said recess and the opposite face of the projecting shaft end, said washers being adapted to prevent relative rotative movement while permitting of limited universal movement between the shafts during rotation thereof.

8. A flexible coupling comprising a shaft having a recessed end, a second shaft having an end projecting into said recess and hemispherical washers between the faces of said recess and opposite faces of the projecting shaft end, said washers being adapted to prevent relative rotative movement while permitting of limited universal movement between the shafts during rotation thereof, and means for holding said shaft ends in overlapped position.

9. A flexible coupling comprising a shaft having a recessed end, a second shaft having an end extending into said recess and a plurality of washers within the recess for connecting the shaft ends and preventing relative rotative movement thereof, said washers having hemispherical faces arranged to permit of limited universal movement between the coupled shaft ends during rotation of one shaft by the other.

10. A flexible coupling comprising a shaft having a recess in one end, a second shaft having an end extending into said recess and a plurality of washers within the recess connecting the shaft ends and preventing relative rotative movement thereof, said washers having hemispherical working faces arranged to permit of limited universal movement between the coupled shaft ends during rotation of one shaft by the other, and means for securing the coupled shaft ends and washers in operative engagement.

11. A flexible coupling comprising a shaft having a recessed end, a second shaft having an end extending into said recess and a plurality of sets of washers within the recess for connecting the shaft ends and preventing relative rotative movement thereof, said sets of washers being arranged in pairs having coacting hemispherical faces arranged to permit of limited universal movement between the coupled shaft ends during rotation thereof.

12. A flexible coupling comprising a shaft having a recessed end, a second shaft having an end extending into said recess and a plurality of sets of washers within the recess for connecting the shaft ends and preventing relative rotative movement thereof, said sets of washers being arranged in pairs having coacting hemispherical faces arranged to permit of limited universal movement between the coupled shaft ends during rotation thereof, and means for securing the coupled shaft ends and washers in operative engagement.

In testimony whereof I have hereunto set my hand.

FRANK R. McGEE.